United States Patent
Drees

(10) Patent No.: US 6,871,223 B2
(45) Date of Patent: Mar. 22, 2005

(54) SYSTEM AND METHOD FOR AGENT REPORTING IN TO SERVER

(75) Inventor: Douglas P. Drees, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 776 days.

(21) Appl. No.: 09/835,212

(22) Filed: Apr. 13, 2001

(65) Prior Publication Data

US 2002/0152277 A1 Oct. 17, 2002

(51) Int. Cl.[7] .............................................. G06F 15/173

(52) U.S. Cl. ...................... 709/223; 709/224; 709/219; 709/202; 709/203; 718/100

(58) Field of Search ................................ 709/223, 224, 709/217, 219, 201, 203; 340/3.1, 3.9; 718/100

(56) References Cited

U.S. PATENT DOCUMENTS

| 5,005,122 | A | * | 4/1991 | Griffin et al. ................ 709/203 |
| 6,098,143 | A | * | 8/2000 | Humpherys et al. ........ 710/260 |
| 6,505,248 | B1 | * | 1/2003 | Casper et al. ................ 709/224 |
| 6,574,729 | B1 | * | 6/2003 | Fink et al. ...................... 713/1 |
| 6,816,964 | B1 | * | 11/2004 | Suzuki et al. .................. 713/2 |
| 2002/0138665 | A1 | * | 9/2002 | Sheetz et al. |
| 2002/0178297 | A1 | * | 11/2002 | Lister et al. |
| 2003/0061323 | A1 | * | 3/2003 | East et al. |

* cited by examiner

*Primary Examiner*—Crystal J. Barnes

(57) ABSTRACT

A system and method for managing a multiple server computer system on a computer network. The system includes a central management server and one or more remote nodes connected to the central management server. A distributed task facility assigns and monitors system management tasks on the remote nodes. An agent running on each of the remote nodes executes system management tasks and initiates contact with the central management server to report the status of the agent and the remote node on which it is running.

23 Claims, 3 Drawing Sheets

SYSTEM AND METHOD FOR AGENT REPORTING IN TO SERVER

TECHNICAL FIELD OF THE INVENTION

This invention relates to computer system administration and management, and, in particular, to determining the status of multi-server management agents.

BACKGROUND OF THE INVENTION

Administration of large, multi-server, computing environments is a field of growing interest as the number and size of large, multi-server computing environments grows. The field of multi-server system administration and management focuses on maintaining the physical operation of a multitude of computer systems, often referred to as nodes, connected in a network. These management tasks include a number of functions, including adding, modifying and removing nodes, users, tools, and roles; defining groups of nodes; authorizing users to perform operations on nodes; installing, maintaining and configuring hardware; installing and upgrading operating system and application software; and applying software patches, among other functions.

Several powerful software applications that assist and centralize the management of large, multi-server, computing environments have been developed in the field. Generally these applications have included a single, large multi-server management application running on a single centrally located management server operated by one or more system administrators, and, in only a few implementations, separate management agent applications running on each of the nodes in the multi-server computing environment.

In such a configuration, the large, central multi-server management application running on a centrally located management server is generally responsible for communicating with the separate management agent applications running on each of the nodes in order to determine the status of any management tasks being performed on each of the nodes. The central multi-server management application is thus required to constantly query the separate management agent applications on each of the nodes. This results in growing demand on network bandwidth as the central multi-server management application must query more and more nodes.

Another result of this arrangement is increasing wait times as the central multi-server management application must wait for responses from each of the nodes before proceeding with other tasks. In addition, the failure of any management agent, or a sudden failure of a node on which a management agent is performing a task, may cause the central multi-server management application to become caught in an indefinite loop waiting for a response from an inactive agent. Furthermore, the central multi-server management application may also be interrupted by the routine removal of a node from service in order to perform a hardware or operating system software upgrade and may not be made aware of the occurrence or nature of the upgrade upon the return of the node to service.

SUMMARY OF THE INVENTION

In one respect, what is described is a system for managing a multiple server computer system on a computer network. The system includes a central management server and one or more remote nodes connected to the central management server. The central management server further comprises a processor for executing programs, a main memory for storing currently executing program code, and a secondary storage device for storing program code and data. Each remote node further comprises a processor for executing programs, a main memory for storing currently executing program code, and a secondary storage device for storing program code and data. The system also includes a distributed task facility that assigns and monitors system management tasks on the remote nodes, running on the processor in the central management server, and an agent, running on the processor in each remote node, that executes system management tasks and initiates contact with the central management server to report the properties of the remote node on which it is running.

In another respect, what is described is a method for managing a multiple server computer system on a computer network, wherein an agent running on a node initiates contact with a central management server to report the properties of the remote node to the central management server. The method includes steps for executing an agent on a remote node and creating a properties object containing information relating to certain properties of the remote node on which the agent is executing. The method also includes steps for the agent initiating contact with a central management server, and the agent passing the properties object from the agent to the central management server, whereby the agent reports the properties of the remote node on which it is executing to the central management server.

In yet another respect, what is described is a computer readable medium on which is embedded a program. The embedded program includes instructions for executing the above method.

Those skilled in the art will appreciate these and other advantages and benefits of various embodiments of the invention upon reading the following detailed description of a preferred embodiment with reference to the below-listed drawings.

DETAILED DESCRIPTION OF THE INVENTION

Figure 1:
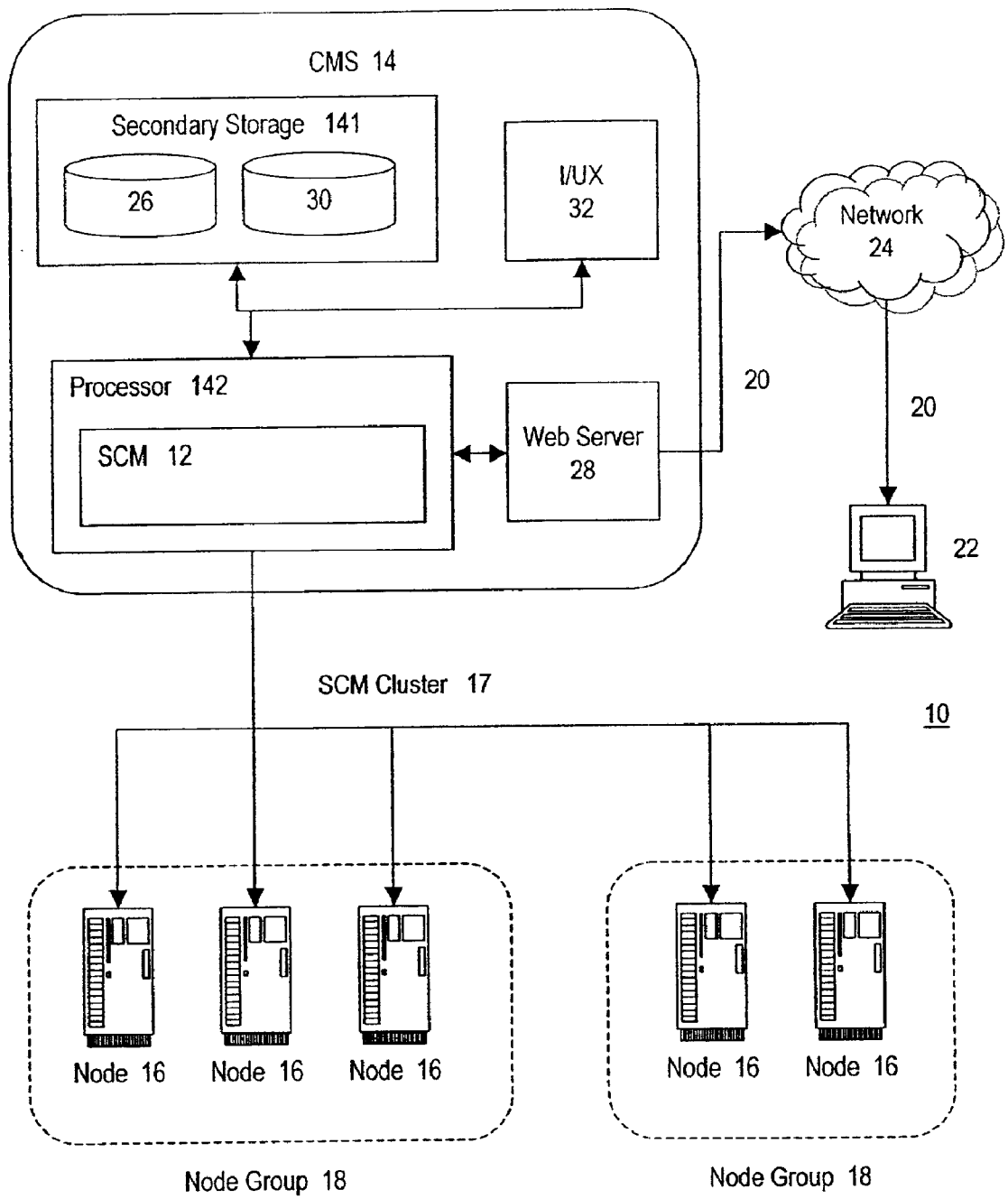
FIG. 1 is a block diagram of a computer system on which the present invention may be run.

FIG. 1 shows a network system 10 on which the present invention may be run. The network system 10 comprises a Service Control Manager ("SCM") 12 running on a Central Management Server ("CMS") 14 and one or more nodes 16 managed by the SCM 12 on the CMS 14. Together the one or more nodes 16 managed by the SCM 12 makeup an SCM cluster 17. A group of nodes 16 may be organized as a node group 18. A node 16 preferably comprises a server or other computer system.

The CMS 14 preferably is an HP-UX11.x server running the SCM 12 software. The CMS 14 includes a memory (not shown), a secondary storage device 141, a processor 142, an input device (not shown), a display device (not shown), and an output device (not shown). The memory, a computer readable medium, may include, RAM or similar types of memory, and it may store one or more applications for execution by processor 142, including the SCM 12 software.

The secondary storage device 141, a computer readable medium, may include a hard disk drive, floppy disk drive, CD-ROM drive, or other types of non-volatile data storage. The processor 142 executes the SCM 12 software and other application(s), which are stored in memory or secondary storage, or received from the Internet or other network 24. An exemplary SCM 12 is programmed in the Java programming language and operates in a Java environment. For a description of an exemplary SCM 12, see *Service Control Manager Technical Reference*, HP part number: B8339-90019, which is incorporated herein by reference and which is accessible at http://www.software.hp.com/products/scmgr.

Generally, the SCM 12 supports managing a single SCM cluster 17 from a single CMS 14. All tasks performed on the SCM cluster 17 are initiated on the CMS 14 either directly or remotely, for example, by reaching the CMS 14 via a web connection 20. Therefore, a workstation 22 at which a user interacts with the system only needs a web connection 20 over a network 24 to the CMS 14 in order to perform tasks on the SCM cluster 17. The workstation 22 preferably comprises a display, a memory, a processor, a secondary storage, an input device and an output device. In addition to the SCM 12 software and the HP-UX server described above, the CMS 14 may also include a data repository 26 for the SCM cluster 17, a web server 28 that allows web access to the SCM 12, a depot 30 comprising products used in the configuring of nodes, and an I/UX server 32. Java objects operating in a Java Virtual Machine ("JWM") can provide the functionality of this exemplary SCM 12.

Object-oriented programming is a method of programming that pairs programming tasks and data into re-usable chunks known as objects. Each object comprises attributes (i.e., data) that define and describe the object. Java classes are meta-definitions that define the structure of a Java object. Java classes when instantiated create instances of the Java classes and are then considered Java objects. Methods within Java objects are called to get or set attributes of the Java object and to change the state of the Java object. Associated with each method is code that is executed when the method is invoked. In addition to the Java programming language, objects and object classes can be implemented with other programming languages.

Figure 2:
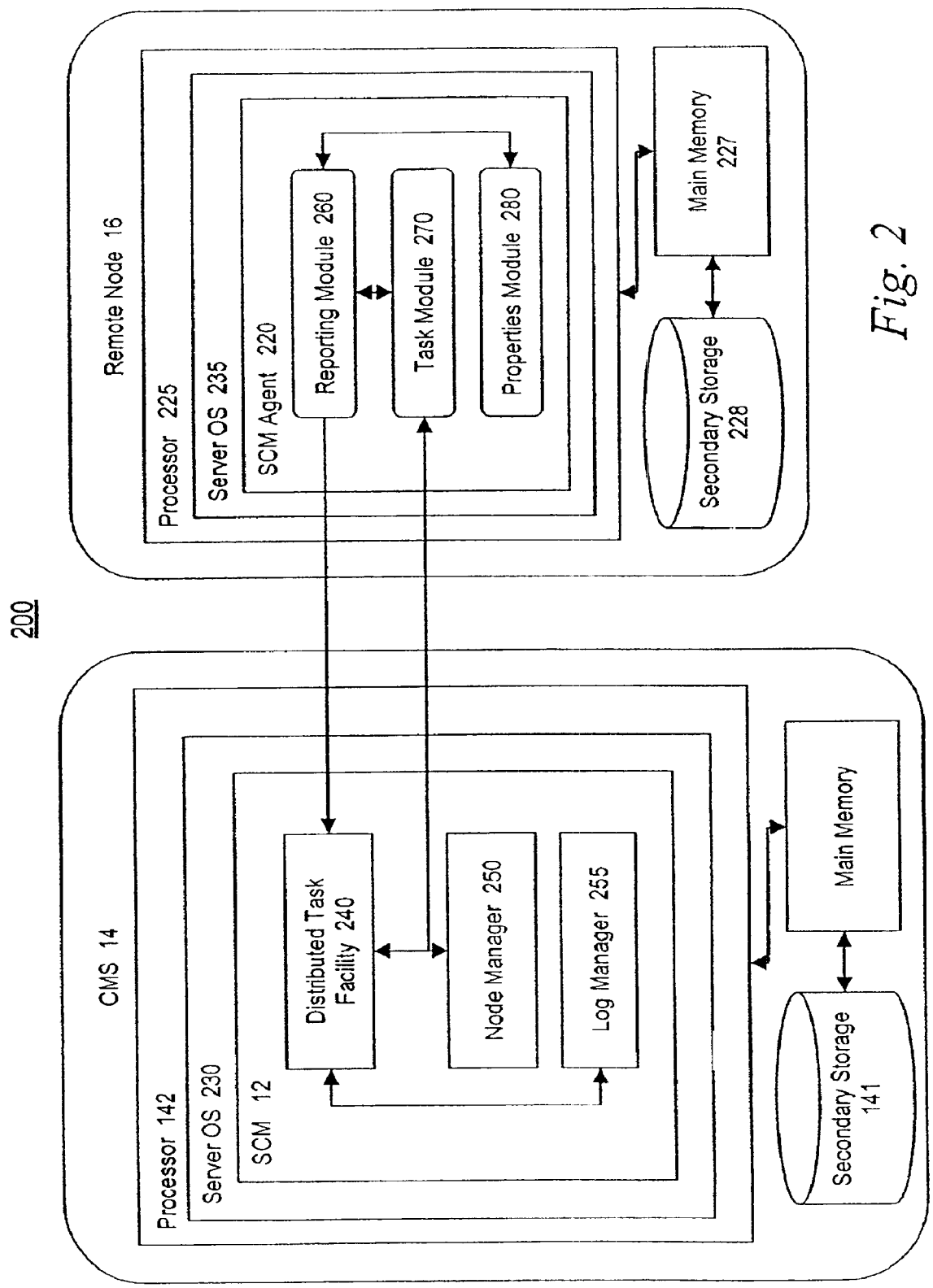
FIG. 2 is a diagram of one embodiment of a system according to the present invention.

FIG. 2 is a diagram of one embodiment of a system 200 according to the present invention. The primary components of the system 200 are an SCM 12 running on the processor 142 of a CMS 14 and a Service Control Manager Agent ("SCM Agent") 220 running on a remote node 16. The remote node 16 is preferably a server which includes a main memory 227, a secondary storage 228, a processor 225, an input device (not shown), a display device (not shown), and an output device (not shown).

The SCM 12 preferably runs under the control of a server operating system 230, which may be a version of the UNIX operating system, such as Hewlett-Packard's HP-UX operating system, or any other version of the UNIX operating system, or other server operating system. In the system 200, the SCM 12 comprises several modules performing discrete multi-system management tasks, including a distributed task facility 240, a node manager 250, and a log manager 255.

The distributed task facility 240 is a module of the SCM 12 responsible for remote execution of tools and tasks on the remote nodes 16 and for communicating with the SCM Agents 220 on the remote nodes 16. The node manager 250 is a module of the SCM 12 responsible for managing node objects. The log manager 255 is a module of the SCM 12 responsible for logging the results and status of tasks and operations performed by the various other components of the SCM 12.

The SCM Agent 220 runs on a processor 225 of the remote node 16 under the control of a server operating system 235, such as those identified above, or other server operating system. The SCM Agent 220 comprises several modules including a reporting module 260, a task module 270 and a properties module 280. The reporting module 260, task module 270 and properties module 280, may preferably be implemented as Java classes. As previously noted, Java classes are meta-definitions that define the structure of a Java object.

The task module 270 is responsible for accepting and executing system management tasks assigned to the SCM Agent 220 by the SCM 12. The properties module 280 is responsible for determining the properties of the remote node 16 on which the SCM Agent 220 is running. The reporting module 260 is responsible for reporting results obtained from the properties module 280, including the status of the SCM Agent 220, to the SCM 12. The SCM Agent 220, through the reporting module 260, initiates contact with and reports in to the distributed task facility 240 on the CMS 14, rather than idling until it is queried by the CMS 14.

When the SCM Agent 220 is started up on the remote node 16, the properties module 280 of the SCM Agent 220 determines selected properties of the node 16 on which it is running, including, for example, the hardware configuration of the node 16, the network name and address of the node 16, the type and version number of the server operating system 235 under which the SCM Agent 220 is running, and the version number and status of the SCM Agent 220. Any operating characteristic of the node 16, hardware, software or otherwise, may be considered a property that can be determined and reported by the SCM Agent 220.

These and other properties determined by the user are then recorded and stored in a properties file, preferably on the secondary storage 228, by the SCM Agent 220 and reported by the reporting module 260 to the distributed task facility 240. The distributed task facility 240 writes the properties of the remote node 16 reported by the SCM Agent 220 to a file or other storage device that is electronically accessible via the network system 10 to all other modules of the SCM 12, including the node manager 250. The SCM 12 can then determine if there are any tasks that had previously been assigned to the SCM Agent 220 for which it has not yet received a response. From this the SCM 12 can determine if the node 16 or the SCM Agent 220 have failed and been re-started. Furthermore, from the properties passed to the SCM 12 by the SCM Agent 220, the SCM 12 can determine, among other things, whether the hardware configuration of the node 16 on which the SCM Agent 220 is running has changed or been upgraded, whether the SCM Agent 220 software has been changed or upgraded, and whether the operating system software 235 running on the node 16 has been changed, patched or upgraded.

The reporting module 260 preferably reports the properties of the node 16 to the distributed task facility 240 by passing a properties object containing property values from the properties file created by the SCM Agent 220.

Figure 3:
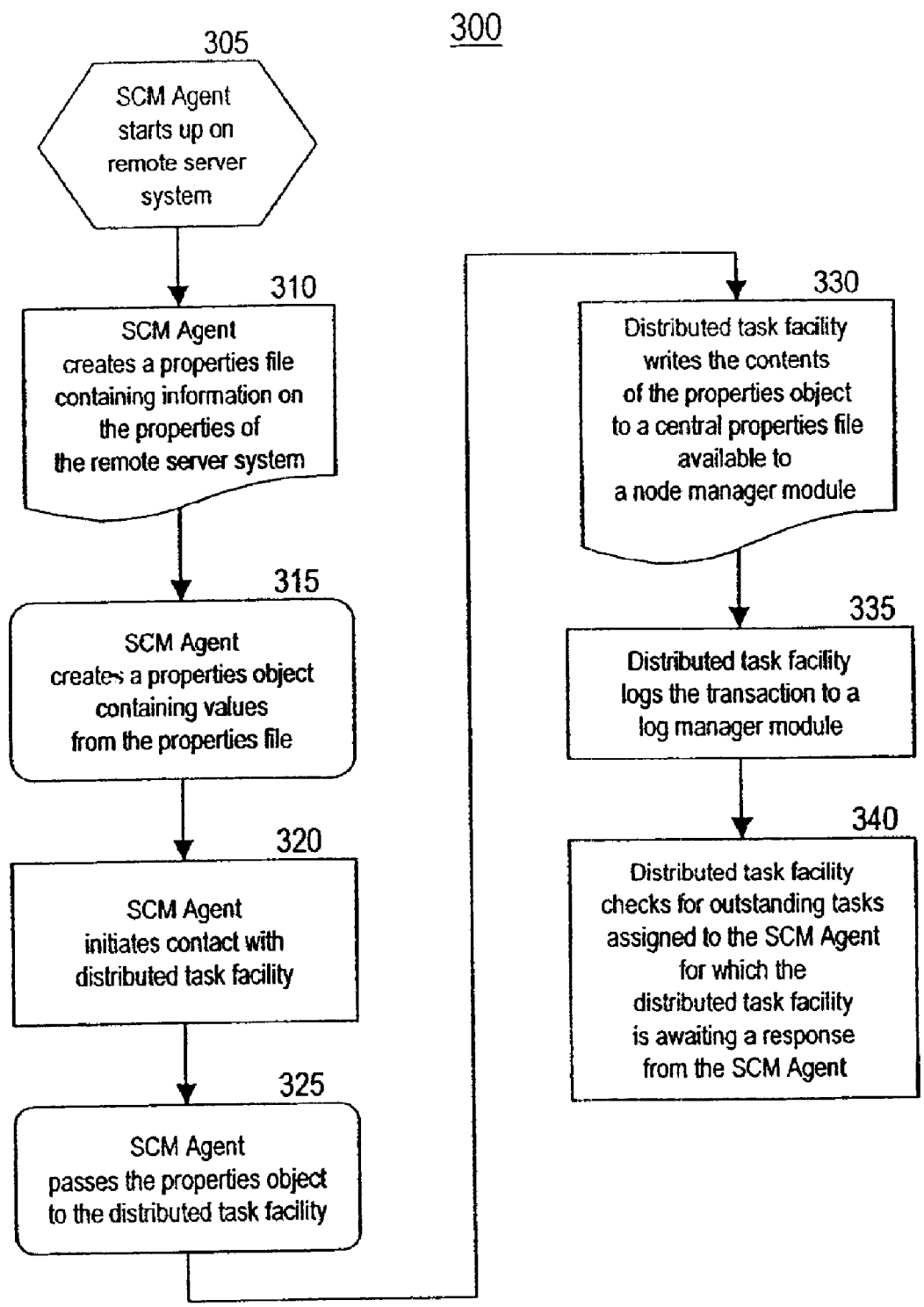
FIG. 3 is a flowchart of one embodiment of a method according to the invention.

FIG. 3 is a flowchart of one embodiment of a method 300 according to the present invention. When a remote node 16 is initially started up, or when it is restarted after a failure or planned outage, the SCM Agent 220 is started up (step 305). In one embodiment of the present invention, the SCM Agent 220 may be started when the remote node 16 is restarted, i.e., rebooted, or by request through a UNIX init(1m) process, or in other ways. In this embodiment of the present invention, the SCM Agent 220, upon startup, runs the properties module 280, preferably implemented as a UNIX shell script, to gather data on the properties of the remote node 16, and then instantiates a JVM which further instantiates an SCM Agent object 220. The SCM Agent object 220 takes over further steps of the method 300.

Following startup of the SCM Agent 220, the SCM Agent 220 creates a properties file (step 310) on the remote node 16, preferably on the secondary storage 228, containing values associated with selected properties of the remote node 16. The SCM Agent 220, through the properties module 280, preferably invokes a shell script to create the properties file. A shell script is used to create the properties file so that a user or system administrator can modify the script to have more control over what properties of the node 16 will be included.

The SCM Agent 220 then creates a properties object (step 315), which may comprise a Java object, containing as attributes the values specified in the properties file created in step 310. Creating a properties object (step 315) may be accomplished by instantiating a properties class and populating the properties object attributes with the values specified by the properties file, by a constructor call, or through other methods of object creation. In a preferred embodiment of the present invention, the SCM Agent 220 invokes a read-properties method of a properties class to populate the properties object with the values from the properties file created upon startup of the SCM Agent 220 in step 310.

The SCM Agent 220 proceeds to initiate contact (step 320) with the distributed task facility 240 on the CMS 14. The SCM Agent 220 may initiate contact with the distributed task facility 240 by way of invoking a method on the SCM 12. In a preferred embodiment of the present invention, the SCM Agent 220 initiates contact with the distributed task facility 240 by using a standard Java Remote Method Invocation registry mechanism and calling a method on the distributed task facility 240, passing the properties object (step 325) as one as one of the arguments of the method call.

In one embodiment, the method 300 may also include a step for authenticating the call from the SCM Agent 220 to the distributed task facility 240 using standard Java security mechanisms. This authentication may be performed to ensure that the SCM Agent 220 is properly authorized to call the distributed task facility 240 and that the distributed task facility 240 being called by the SCM Agent 220 is the correct distributed task facility 240 associated with the remote node 16. Once contact is made and authenticated between the SCM Agent 220 and the distributed task facility 240, the SCM Agent 220 passes the properties object (step 325) to the distributed task facility 240.

Upon receiving the properties object from the SCM Agent 220, the distributed task facility 240 writes (step 330) the contents of the properties object to a central properties file (in the secondary storage 141, for example) on the CMS 14. The central properties file is preferably then available to other functions or modules of the SCM 12, including the node manager 250. The distributed task facility 240 logs (step 335) the transaction of receiving and writing the properties object data to the log manager 255 to indicate that an SCM Agent 220 has restarted and reported in.

After logging the transaction (step 335), the distributed task facility 240 checks to determine if there were any outstanding tasks (step 340), assigned to the SCM Agent 220 prior to contact being initiated with the distributed task facility 240 by the SCM Agent 220, for which the distributed task facility 240 is still awaiting a response from the SCM Agent 220. If so, then the distributed task facility 240 preferably flags such tasks as failed. The tasks are considered failed since the SCM Agent 220 has restarted since the tasks were assigned to the SCM Agent 220 without the SCM Agent 220 previously noting the completion of such tasks to the distributed task facility 240.

The steps of the method 300 can be implemented with hardware or by execution of programs, modules or scripts. The programs, modules or scripts can be stored or embodied on one or more computer readable mediums in a variety of formats, such as source code, object code or executable code, for example. The computer readable mediums may include, for example, both storage devices, such as the CMS 14 memory or secondary storage device 141, and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for managing a multiple server computer system on a computer network, the system comprising:
   a central management server;
   one or more remote nodes connected to the central management server;
   a distributed task facility, running on the central management server, that assigns and monitors system management tasks on one or more of the remote nodes; and
   an agent, running on each remote node, that executes system management tasks and initiates contact with the central management server to report the properties of the remote node on which it is running only whenever the remote node starts or restarts.

2. The system of claim 1, wherein the agent further comprises:
   a task module that executes tasks assigned to the agent by the distributed task facility;
   a properties module that gathers information describing properties of a remote node on which the agent is running; and
   a reporting module that initiates and executes reporting of the properties of the remote node to the distributed task facility.

3. The system of claim 2, wherein the reporting module reports the properties of the remote node to the distributed task facility by passing a properties object to the distributed task facility.

4. The system of claim 3, wherein the properties object comprises a Java object.

5. The system of claim 2, wherein the properties of the remote node includes the status of the agent and of the remote node on which it is running.

6. The system of claim 1 wherein the properties of the remote node reported by the agent include hardware configuration of the remote node, network name and address of the remote node, type and version of operating system under which the agent is running, and other properties that would affect which tasks should be run on the remote node.

7. A method for managing a multiple server computer system on a computer network, the method comprising the steps of:
   executing an agent on a remote node; creating a properties object, containing values for certain properties of the remote node on which the agent is executing;
   an agent initiating contact with a central management server; and
   the agent passing the properties of the remote node on which it is executing to the central management server only whenever the remote node starts or restarts.

8. The method of claim 7, wherein the creating step comprises specifying the status of the agent and of the remote node on which it is executing.

9. The method of claim 8, further comprising creating a properties file on the remote node containing data describing the certain properties of the remote node on which the agent is executing, wherein the properties object is created using the values of the data contained in the properties file.

10. The method of claim 8, wherein the passing step comprises passing the properties object from the agent to the distributed task facility.

11. The method of claim 8, wherein the initiating contact step comprises the agent initiating contact with a distributed task facility on the central management server.

12. The method of claim 8, further comprising initiating the executing step upon restarting operation of the remote node upon which it resides.

13. The method of claim 8, further comprising initiating the executing step following a hardware system upgrade to the remote node upon which it resides.

14. The method of claim 8, further comprising initiating the executing step following an upgrade or patch to the operating system software on the remote node upon which it resides.

15. The method of claim 7 wherein creating a properties object creates a properties object containing values for the properties including hardware configuration of the remote node, network name and address of the remote node, type and version of operating system under which the agent is running, and other such properties as would affect which tasks should be run on the remote node.

16. A computer readable medium on which is embedded a program, the program comprising modules that execute a method for managing a multiple server computer system on a computer network, the method comprising the steps of:
   executing an agent on a remote node;
   creating a properties object, containing values for certain properties of the remote node on which the agent is executing;
   an agent initiating contact with a central management server; and
   the agent passing the properties object from the agent to the central management server, whereby the agent reports the properties of the remote node on which it is executing to the central management server only whenever the remote starts or restarts.

17. The computer readable medium of claim 16, wherein the properties of the remote node includes the status of the agent and of the remote node on which it is executing.

18. The computer readable medium of claim 17, wherein the initiating contact step comprises the agent initiating contact with a distributed task facility on the central management server.

19. The computer readable medium of claim 17, further comprising passing the properties object from the agent to the distributed task facility.

20. The computer readable medium of claim 17, further comprising creating a properties file on the remote node containing data describing the certain properties of the remote node on which the agent is executing, wherein the properties object is created using the values of the data contained in the properties file.

21. The computer readable medium of claim 16 wherein creating a properties object creates a properties object containing values for the properties including hardware configuration of the remote node, network name and address of the remote node, type and version of operating system under which the agent is running, and other properties that would affect which tasks should be run on the remote node.

22. A method for managing a multiple server computer system on a computer network, the method comprising the steps of:
   executing an agent on a remote node;
   creating a properties object containing values for certain properties of the remote node on which the agent is executing;
   an agent initiating contact with a distributed task facility on a central management server;
   the agent passing the properties of the remote node on which it is executing to the central management server, wherein the creating step comprises specifying the status of the agent and of the remote node on which it is executing;
   writing the contents of the properties object to a central properties file on the central management server;
   making the central properties file available to a node manager module executing on the central management server;
   logging the transaction between the distributed task facility and the agent to a log manager module; and
   checking for any outstanding tasks previously assigned to the agent for which the distributed task facility is still awaiting a response from the agent.

23. A computer readable medium on which is embedded a program, the program comprising modules that execute a method for managing a multiple server computer system on a computer network, the method comprising the steps of:
   executing an agent on a remote node;
   creating a properties object containing values for certain properties of the remote node on which the agent is executing;
   an agent initiating contact with a distributed task facility on a central management server;
   the agent passing the properties object from the agent to the central management server, whereby the agent reports the properties of the remote node on which it is executing to the central management server, wherein the properties of the remote node includes the status of the agent and of the remote node on which it is executing;
   writing the contents of the properties object to a central properties file on the central management server;

making the central properties file available to a node manager module executing on the central management server;

logging the transaction between the distributed task facility and the agent to a log manager module; and checking for any outstanding tasks previously assigned to the agent for which the distributed task facility is still awaiting a response from the agent.

* * * * *